3,361,715
PROCESS FOR ACCELERATING THE REACTION OF EPOXY COMPOUNDS WITH COMPOUNDS CONTAINING NH₂ AND/OR NH GROUPS
Wilhelm Vogt, Cologne-Sulz, Paul Jannsen, Cologne, and Hermann Richtzenhain, Cologne-Sulz, Germany, assignors to Dynamit Nobel Aktiengesellschaft, Troisdorf, Bezirk Cologne, Germany
No Drawing. Filed Apr. 23, 1964, Ser. No. 362,201
Claims priority, application Germany, Apr. 26, 1963, D 41,435
11 Claims. (Cl. 260—47)

This invention relates to a process for accelerating the reaction of epoxy compounds with compounds containing $NH_2$ and/or NH groups in their molecules, and more particularly to a process for accelerating the reaction of mono- and poly-epoxy compounds with compounds containing at least one or more $NH_2$ and/or NH groups by effecting the reaction in the presence of a compound containing at least one nitrogen-carbon-sulfur group as an accelerator. Further, the invention relates to an improved novel epoxy resin material which may be hardened into a superior cured resin exhibiting substantially superior mechanical properties compared to the known epoxy resin materials.

The reaction of epoxy compounds with univalent or multivalent aliphatic, aromatic or hydroaromatic amines, amides or sulfonamides is known. This reaction is industrially important as a method for amine-hardening epoxy resins. However, the amine-hardening takes place at greatly varying speeds, depending on the nature of the epoxy resin and the hardener used. As in many cases, a rapid hardening is desired; numerous attempts have been made in accelerating the hardening reaction. Thus, it has been proposed to employ phenol or its derivatives, such as, for example, 2,4,6-tris(dimethylaminomethyl)-phenol, as an accelerator. Furthermore, sulfur-containing compounds, as for instance compounds having a mercapto, sulfide, disulfide or sulfoxide group in which the sulfur is not bound cyclically, have also been proposed for use as compounds for accelerating the reaction of epoxy resins with conventional hardening agents. However, the acceleration which is achieved with the latter compound is still far from commercially satisfactory.

It is among the objects of this invention to provide a process for accelerating the reaction of epoxy compounds with compounds containing at least one $NH_2$ and/or NH group that is easily and safely practised and efficient.

Another object is to provide a process for accelerating the reaction of epoxy compounds with compounds containing at least one $NH_2$ and/or NH group that is equally suitable for almost all reactions involving epoxy compounds and compounds containing at least one $NH_2$ and/or NH group.

A still further object of this invention is the preparation of novel products comprising the product of the reaction of an epoxy compound and a compound containing at least one $NH_2$ and/or NH group in the presence of an accelerator containing an —NCS group.

These and other objects will become apparent during the following discussion.

Now, in accordance with the invention, it has been found that the reaction of epoxy compounds with compounds containing $NH_2$ and/or NH groups can be substantially accelerated if the reaction is conducted in the presence of a compound containing at least one —NCS group which is not directly bound to an —SH—, —SN— or —SS— group and in which, additionally, the N-atom is not substituted by an H-atom, and the S-atom does not form part of a mercapto group.

As —NCS group containing compounds suitable for the present reaction, there are applicable, for instance, the thiocyanogen compounds, which may be used in the form of the salts of thiocyanic acid, in the form of complex compounds of these salts with inorganic or organic compounds or in the form of organic thiocyanogen compounds. Included among such compounds are, for example, $NH_4SCN$, NaSCN, KSCN, $Mg(SCN)_2$, $Ca(SCN)_2$, $Zn(SCN)_2$, $Mn(SCN)_2$, pyridine·HSCN, quinoline·HSCN, o- and p-toluidine·HSCN guanidine·HSCN, $Cd(SCN)_2·4NH_3$, $Zn(SCN)_2·2N_2H_4$, $Mn(SCN)_2·2N_2H_4$, $2KSCN·[(CH_2)_6N_4]$, $Zn(SCN)_2·(pyridine)_4$, $Mn(C_5H_5N)_2·(SCN)_2$ $NaSCN·(C_3H_6O)$ and $[(NH_2)_2CS]_3·KSCN$.

In addition to the above-mentioned cyanogen compounds, compounds which contain the —NCS group incorporated into a ring are also excellent accelerating agents for the reaction of epoxy compounds with compounds containing an $NH_2$ and/or NH group. Examples of such compounds are the derivatives of tetrahydrothiadiazine (I), particularly the derivatives of tetrahydrothiazinethione (II)

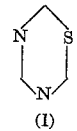 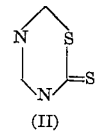

(I)      (II)

Compounds having the formula (II) can be prepared using conventional methods as, for instance, by the condensation of aldehydes, amines and carbon disulfide. A particularly effective compound representative of the cyclic compounds having an —NCS group is 3,5-dimethyltetrahydrothiadiazine-2-thione, which can be easily prepared by reacting 2 mols methylamine, 2 mols formaldehyde and 1 mol carbon disulfide.

The amounts of accelerating agent to be added varies over a broad range and depends on the reactivity of the amine and/or epoxy components. Generally, amounts of accelerating compound ranging from 0.05 to 10 weight percent, and preferably 0.5 to 5 weight percent, referred to the epoxy compound, are suitable, although in many instances smaller or larger amounts may be used advantageously.

The accelerating —NCS compound can be added to the mixture of epoxy compound and amine or amide compound per se or in the form of a dispersion thereof, or even in the form of a solution thereof in a solvent inert with respect to the reaction components. Alternatively, the —NCS compound can be introduced together with one of the reactants.

The compounds containing —NCS groups act to considerably accelerate the reaction of the epoxy compounds with the compounds containing $NH_2$ and/or NH groups even at temperatures lower than 10° C. The reaction time can, however, be even further reduced by increasing the temperature at which the reaction is conducted.

The epoxy compounds suitable for use in the reaction of the invention include the epoxides of mono- or poly-unsaturated hydrocarbons (ethylene, propylene, butylene, butadiene, cyclohexene, vinylcyclohexene, dicyclopentadiene, cyclododecatriene, polybutadiene, styrene; epoxy compounds containing halogen, as for instance epichlorhydrin, epoxyethers of monohydric alcohol, as for example of methyl, ethyl, butyl, and 2-ethylhexyl alcohol; epoxide ethers of polyhydric alcohols exemplified by ethylene, propylene, butylene glycol, polyglycols, glycerine, pentaerythritol, and the like; epoxide ethers of monohydroxy and polyhydric phenols, as for instance phenol, cresol, resorcinol, hydroquinone, 4,4'-dioxydiphenyl, 4,4'-dioxydiphenylmethane, 2,2 - bis(4 - oxyphenyl)-propane, 4,4'-dioxydiphenylsulfone, phenolformaldehyde condensation products; and epoxy compounds containing nitrogen, as for instance N,N-diglycidylaniline, N,N'-dimethyl-diglycidyl-4,4'-diaminodiphenylmethane.

Thus, the polyepoxides used in the preparation of the novel products of the invention comprise all those organic compounds containing at least two reactive epoxy

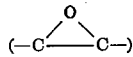

groups in their molecule. The polyepoxides may be saturated or unsaturated, aliphatic, cycloaliphatic, aromatic or heterocyclic and may be substituted if desired with non-interfering substituents. The polyepoxides may be monomeric or polymeric.

The monomeric-type polyepoxide compounds may be exemplified by the following:

vinyl cyclohexane dioxide,
epoxidized soyabean oil,
butadiene dioxide,
1,4-bis(2,3-epoxypropoxy)-benzene,
1,3-bis(2,3-epoxypropoxy)-benzene,
4,4'-bis(2,3-epoxypropoxy)-diphenyl ether,
1,8-bis(2,3-epoxypropoxy)-octane,
1,4-bis(2,3-epoxypropoxy)-cyclohexane,
4,4'-bis(2-hydroxy-3,4-epoxybutoxy)-diphenyldimethylmethane,
1,3-bis(4,5-epoxypentoxy)-5-chlorobenzene,
1,4-bis(3,4-epoxybutoxy)-2-chlorocyclohexane,
diglycidyl ether,
1,3-(2-hydroxy-3,4-epoxybutoxy)-benzene,
1,4-bis(2-hydroxy-4,5-epoxypentoxy)-benzene,
1,2,5,6-diepoxy-3-hexene,
1,2,5,6-diepoxyhexane, and
1,2,3,4-tetra(2-hydroxy-3,4-epoxybutoxy)-butane.

Other examples of this type include the glycidyl polyethers of the polyhydric phenols obtained by reacting a polyhydric phenol with a great excess, e.g., 4 to 8 mol excess, of a halogen-containing epoxide in an alkaline medium. Thus, 2,2-bis(2,3-epoxypropoxyphenyl)-propane is obtained by reacting bis-phenol 2,2-bis(4-hydroxyphenyl)-propane with an excess of epichlorohydrin as indicated below. Other polyhydric phenols that can be used for this purpose include resorcinol, catechol, hydroquinone, methyl resorcinol, or polynuclear phenols, such as 2,2-bis(4-hydroxyphenyl)-butane, 4,4 - dihydroxybenzophenone, bis(4 - hydroxyphenyl) - ethane, and 1,5 - dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

Examples of the polymeric-type polyepoxides include the polyepoxypolyhydroxy polyethers obtained by reacting, preferably in an alkaline or an acid medium, a polyhydric alcohol or polyhydric phenol with a polyepoxide, such as the reaction product of glycerol and bis(2,3-epoxypropyl)-ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl)-ether, the reaction product of resorcinol and bis(2,3-epoxypropyl)-ether, and the reaction product of catechol and bis(2,3-epoxypropyl)-ether.

A further group of the polymeric polyepoxides comprises the hydroxy-substituted polyepoxy polyethers, obtained by reacting, preferably in an alkaline medium, a slight excess, e.g., .5 to 3 mol excess of a halogen-containing epoxide as described above, with any of the aforedescribed polyhydric phenols, such as resorcinol, catechol, bisphenol, bis(2,2'-dihydroxy-dinaphthyl)-methane, and the like.

Also included within this group are the polyepoxy polyethers obtained by reacting, preferably in the presence of an acid-acting compound, such as boron trifluoride, one of the aforedescribed halogen-containing epoxides with a polyhydric alcohol, such as glycerol, propylene glycol, ethylene glycol, trimethylene glycol, butylene glycol, and the like, and subsequently treating the resulting product with an alkaline component.

In accordance with the invention, mixtures of the aforesaid epoxy compounds including mixtures of mono- and poly-epoxides as well as such mixtures and of the epoxides per se, with solvents or plasticizers, can be converted by the process of the invention. Similarly, pure epoxides can be reacted with the NH₂ and/or group-containing compounds in the presence of the accelerator as set forth above to form the novel products of the invention.

Examples of compounds containing $NH_2$ and/or NH groups suitable for use in the reaction with the epoxy compounds include the aliphatic, cycloaliphatic, aromatic or heterocyclic amines, imines, amides and imides having one or more of $NH_2$ and/or NH groups, the amido-amines of carboxylic, sulfuric, and sulfocarboxylic acids, ether amines and oxyamines and polymeric amines, imines, amides and imides.

The epoxy resins which are cured with compounds containing $NH_2$ or NH groups in the presence of an accelerator as set forth in accordance with the invention exhibit a greater cross-linking which is a direct result of the rapid hardening which is the result of the instant reaction and which, in turn, results in epoxy resin products characterized by improved mechanical properties as compared to the epoxy resins cured in the absence of any accelerator.

The reaction products of the process of the invention, where mono epoxides are the starting materials, constitute valuable intermediates for the manufacture of drugs, textile adjuvant and plastic products. Mixtures of poly epoxides, compounds containing $NH_2$ and/or NH groups and accelerators, in accordance with the instant invention, are suitable for use as fast-curing casting resins, coating substances, varnish resins and adhesives. It is possible, in accordance with the invention, to add fillers, pigments, coloring agents, plasticizers and the like to form resins suitable for many purposes.

The more detailed practice of the invention is illustrated by the following examples. There are, of course, many forms of the invention other than these specific embodiments.

In the following examples, the time for the reaction of the epoxy compounds with the compounds containing $NH_2$ or NH groups and the accelerators is given as well as the time required when no accelerators are used.

*Example 1*

In parallel experiments, 555 grams propylene oxide and 700 grams diethylamine (molar ratio 1:1) were reacted at 20° C., with and without the addition of Ca(SCN)₂·4H₂O (2 weight percent with reference to propylene oxide), and the percent conversion was determined at certain intervals of time. The results were as follows:

| Time of Experiment | Conversion in Percent | |
|---|---|---|
| | Without Accelerator | With Accelerator |
| 1 hour | <1 | 28 |
| 2 hours | <1 | 40 |
| 4 hours | <1 | 58 |
| 6 hours | <1 | 67 |

*Example 2*

In parallel experiments, 350 g. 4-vinylcyclohexene dioxide and 183 g. diethylamine (molar ratio 1:1) were reacted at 50° C. with and without calcium thiocyanate (2 wt. percent with reference to the 4-vinylcyclohexene dioxide), and the percent conversion was determined at certain intervals of time. The following results were obtained:

| Time of Experiment | Conversion in Percent | |
|---|---|---|
| | Without Accelerator | With Accelerator |
| 1 hour | <1 | 14 |
| 2 hours | 1 | 22 |
| 3 hours | 1.8 | 26 |
| 5 hours | 3.0 | 32 |
| 7 hours | 4.0 | 38 |

*Example 3*

Mixtures of 50 g. of a diglycidyl ether prepared from 2,2-bis(4-oxyphenyl)-propane, having an epoxy value of 0.53 (A. M. Paquin, "Epoxydverbindungen und Epoxydharze," (1958) page 754), and one of the following hardeners:

A. 14 g. N-cyclohexyl-1,3-diaminopropane
B. 27 g. of a hardener consisting of an amidoamine of long-chain partially dimerized fatty acids, which is commercially available under the tradename GM I-250 by Schering AG, Berglcamen, Germany
C. 14 g. 2-methyl-3,3-bis($\gamma$-aminopropyl)-3,4,5,6-tetrahydropyridine
D. 17.5 g. 2-methyl-3,3-bis($\gamma$-aminopropyl)-3,4,5,6-tetrahydropyridine with 20% isopropanol
E. 6.5 g. of triethylenetetramine.

had added thereto one gram of each of the accelerators listed in the table which follows, at a temperature of 23° C. The gelling time was then determined by a "Tecam" instrument delivered by Gebr. Klees, Düsseldorf, Germany.

| Accelerator | Mixture | | | | |
|---|---|---|---|---|---|
| | A | B | C | D | E |
| | Gelling time (in minutes) | | | | |
| 1 None | 90 | 115 | 145 | 125 | 60 |
| 2 2,4,6-tris-(dimethylaminomethyl)-phenol | 75 | 78 | 130 | 75 | 26 |
| 3 Triphenylphosphite | 65 | 55 | 105 | 58 | 20 |
| 4 Phenol | 57 | 54 | 57 | 56 | 20 |
| 5 3,5-dimethyltetrahydrothiadiazine-2-thione | 31 | 32 | 75 | 55 | 13 |
| 6 Diphenylthiourea | 22 | 47 | 79 | 53 | 17 |
| 7 [S=C(NH$_2$)$_2$]$_3$·KSCN | 14 | 28 | 22 | 35 | 7 |
| 8 KSCN | 13 | 23 | 30 | 21 | 15 |
| 9 NaSCN | 12 | 31 | 30 | 21 | 9 |
| 10 NH$_4$SCN | 11 | 24 | 14 | 15 | 11 |
| 11 Guanidine-HSCN | 7 | 22 | 22 | 23 | 8 |
| 12 Ca(SCN)$_2$ | 7 | 16 | 16 | 14 | 8 |

*Example 4*

50 grams diglycidyl ether prepared from 2,2-bis(4-oxyphenyl)-propane having an epoxy value of 0.53, and 14 grams of di-1,4-($\gamma$-aminopropoxy)-butane as hardener, to which varying amounts of Ca(SCN)$_2$ as accelerator were added were hardened at 23° C. The gelling time was then determined.

Accelerator in percent referred to the epoxy resin:     Gelling time (min.)
None _____ 90
0.2 Ca(SCN)$_2$ _____ 57
0.4 Ca(SCN)$_2$ _____ 28
1.0 Ca(SCN)$_2$ _____ 12
2.0 Ca(SCN)$_2$ _____ 7

*Example 5*

41 grams of a hardener consisting of an amidoamine of long-chain partially dimerized fatty acids (available commercially under the name GM I-250) and one gram of one of the accelerators listed in the following table were added to 50 grams of a resorcinol diglycidyl ether with an epoxy value of 0.79, at 23° C., and the gelling time was then determined.

Accelerator:     Gelling time (min.)
None _____ 24
Triphenylphosphite _____ 21
Diphenylthiourea _____ 21
Phenol _____ 19
KSCN _____ 15
NH$_4$SCN _____ 15
Ca(SCN)$_2$ _____ 13
[S=C(NH$_2$)$_2$]$_3$·KSCN _____ 13

*Example 6*

1 gram of an accelerator listed in the following table was added to 50 grams of a mixture of two epoxy compounds (consisting of 90 wt. percent of diglycidylether prepared from 2,2-bis(4-oxyphenyl)-propane having an epoxy value of 0.53 and 10 wt. percent of 2-ethylhexylgylcidyl ether), and 7 grams of di-1,4-($\gamma$-aminopropoxy)-butane, at 25° C., and the gelling time then determined.

Accelerator:     Gelling time (min.)
None _____ 135
Phenol _____ 58
NaSCN _____ 18
NH$_4$SCN _____ 16
Ca(SCN)$_2$ _____ 16

*Example 7*

100 g. of a diglycidyl ether of 2,2-bis(4-oxyphenyl)-propane having an epoxy value of 0.2 were hardened with 11.8 grams 4,4'-diaminodicyclohexylpropane at 80° C., with and without Ca(SCN)$_2$ as accelerator. A batch which was hardened without any accelerator completely hardened only after 10 minutes, while a batch to which 2 wt. percent Ca(SCN)$_2$·4H$_2$O as accelerator had been added was completely hardened in 2 minutes.

*Example 8*

50 g. of a diglycidyl ether of 2,2-bis(4-oxyphenyl)-propane having an apoxy value of 0.53 were hardened with 14 g. N-cyclohexyl-1,3-diaminopropane in the presence of 3 mil. of a wt. percent solution of KSCN in 1,1,1-trimethylol-propane at a temperature of 23° C. The gelling time was then determined according to Example 3. A batch which was hardened without any accelerator completely hardened only after 90 minutes, while a batch with the above accelerator added was completely hardened in 12 minutes.

The above described solvent for KSCN (1,1,1-trimethylol-propane) can be substituted by ethylene glycol, diethylene glycol, triethylene glycol, glycerine, glycerine-1-methyl ether, ethylene, glycol methyl ether, dimethyl sulfoxide and the like.

We claim:
1. In the process of reacting a member selected from the group consisting of monoepoxides, polyepoxides and mixtures thereof with a NH$_2$ and/or NH containing compound selected from the group consisting of aliphatic amines and cycloaliphatic amines the improvement for accelerating the reaction which comprises employing a compound selected from the group consisting of NH$_4$SCN, NaSCN, KSCN, Mg(SCN)$_2$, Ca(SCN)$_2$, Zn(SCN)$_2$, pyridine·HSCN, quinoline·HSCN,
    o- and p-toluidine·HSCN,
guanidine·HSCN, Cd(SCN)$_2$·4HN$_3$, ZN(SCN)$_2$·2N$_2$H$_4$,
    Mn(SCN)$_2$·2N$_2$H$_4$, 2KSCN·[(CH$_2$)$_6$N$_4$]
    Zn(SCN)$_2$·(pyridine)$_4$, Mn(C$_5$H$_5$N)$_2$·(SCN)$_2$
    NaSCN·(C$_3$H$_6$O), [S=C(NH$_2$)$_2$]$_3$·KSCN

[(NH$_2$)$_2$SC]$_3$·KSCN, tetrahydro-1,3,5-thiadiazine and 3,5-dimethyl tetrahydro-1,3,5-thiadiazine-2-thione in an amount of 0.05 to 10 wt. percent referred to said epoxide as an accelerator.

2. Improvement according to claim 1 wherein said accelerating compound is employed in an amount of 0.5 to 5 wt. percent referred to said epoxide.

3. Improvement according to claim 1 wherein said accelerating compound is used in the form of its solution in an inert solvent.

4. Improvement according to claim 1 wherein said accelerating compound is 3,5 - dimethyl - tetrahydro - 1,3,5-thiadiazine-2-thione.

5. Improvement according to claim 1 wherein said accelerating compound is tetrahydro-1,3,5-thiadiazine.

6. In the process of reacting propylene oxide with diethylamine, the improvement for accelerating the reaction which comprises employing 0.05 to 10 wt. percent referred to the propylene oxide of $Ca(SCN)_2 \cdot 4H_2O$ as an accelerator.

7. In the process of reacting 4-vinylcyclohexenedioxide with diethylamine, the improvement for accelerating said reaction which comprises employing 0.05 to 10 wt. percent of calcium thiocyanate referred to the 4-vinylcyclohexenedioxide as accelerator.

8. In the process of reacting a diglycidyl ether prepared from 2,2 - bis(4 - oxyphenyl) - propane having an epoxy value of 0.53 with N-cyclohexyl-1,3-diaminopropane, the improvement for accelerating said reaction which comprises employing 0.05 to 10 wt. percent of $$[S=C(NH_2)_2]_3 \cdot KSCN$$

referred to said diglycidyl ether as accelerator.

9. In the process of reacting a diglycidyl ether prepared from 2,2 - bis(4 - oxyphenyl) - propane having an epoxy value of 0.53 with 2-methyl-3,3-bis(γ-aminopropyl)-3,4,5,6-tetrahydropyridine, the improvement for accelerating said reaction which comprises employing 0.05 to 10 wt. percent of KSCN referred to said diglycidyl ether as accelerator.

10. In the process of reacting a diglycidyl ether prepared from 2,2 - bis(4 - oxyphenyl) - propane having an epoxy value of 0.53 with triethylenetetramine, the improvement for accelerating said reaction which comprises employing 0.05 to 10 wt. percent of guanidine-HNSC referred to said diglycidyl ether as accelerator.

11. In the process of reacting a mixture of a diglycidyl ether prepared from 2,2-bis(4-oxyphenyl)-propane having an epoxy value of 0.53 and 2-ethylhexylhexylglycidyl ether with 1,4-(γ-aminopropoxy)-butane, the improvement for accelerating said reaction which comprises employing 0.05 to 10 wt. percent of $NH_4SCN$ referred to the epoxy mixture as accelerator.

References Cited

UNITED STATES PATENTS

| | | |
|---|---|---|
| 3,134,784 | 5/1964 | Skeeter et al. |
| 2,957,844 | 10/1960 | Wesp. |
| 2,838,389 | 6/1958 | Yoder. |
| 3,294,865 | 12/1966 | Price _____ 260—836 X |

DONALD E. CZAJA, *Primary Examiner.*

L. J. BERCOVITZ, *Examiner.*

C. W. IVY, *Assistant Examiner.*

UNITED STATES PATENT OFFICE
CERTIFICATE OF CORRECTION

Patent No. 3,361,715                                       January 2, 1968

Wilhelm Vogt et al.

It is hereby certified that error appears in the above numbered patent requiring correction and that the said Letters Patent should read as corrected below.

In the heading to the printed specification, line 5, for "Jannsen" read -- Janssen --; line 8, after "Germany" insert -- , a German corporation --; column 1, line 34, for "in accelerating" read -- to accelerate --; line 36, for "2,4,6-tris(dimethylaminomethyl)-phenol," read -- 2,4,6-tris-(dimethylaminomethyl)-phenol --; column 3, line 47, for "4,4-dihydroxybenzo-" read -- 4,4′-dihydroxybenzo- --; column 4, line 11, after "and/or" insert -- NH --; column 5, line 24, for "Berglcamen" read -- Bergkamen --; column 6, line 11, for "13" read -- 14 --; line 42, for "apoxy" read -- epoxy --; line 44, for "mil. of a wt." read -- ml. of a 30 wt. --; line 54, after "ethylene" strike out the comma; column 8, line 11, for "HNSC" read -- HSCN --; line 14, for "2-ethylhexylhexylglycidyl" read -- 2-ethylhexylglycidyl --; line 23, for "Skeeter et al" read -- Seeger et al --.

Signed and sealed this 29th day of April 1969.

(SEAL)
Attest:

EDWARD M. FLETCHER, JR.                      EDWARD J. BRENNER
Attesting Officer                                Commissioner of Patents